(12) United States Patent
Shimada et al.

(10) Patent No.: US 9,261,689 B2
(45) Date of Patent: Feb. 16, 2016

(54) SCANNING OPTICAL MICROSCOPE

(71) Applicant: OLYMPUS CORPORATION, Shibuya-ku, Tokyo (JP)

(72) Inventors: Yoshihiro Shimada, Sagamihara (JP); Makio Ueno, Nagano (JP); Shingo Tamano, Hachioji (JP); Naoki Hayashi, Nagano (JP); Eiji Yokoi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/298,707

(22) Filed: Jun. 6, 2014

(65) Prior Publication Data
US 2014/0376078 A1    Dec. 25, 2014

(30) Foreign Application Priority Data
Jun. 24, 2013 (JP) ................................. 2013-131824

(51) Int. Cl.
*G02B 21/06* (2006.01)
*G02F 1/11* (2006.01)
*G02B 21/26* (2006.01)
(Continued)

(52) U.S. Cl.
CPC .......... *G02B 21/0032* (2013.01); *G02B 21/002* (2013.01); *G02B 21/0036* (2013.01); *G02B 21/0096* (2013.01); *G02B 21/06* (2013.01); *G02B 21/26* (2013.01); *G02B 27/4261* (2013.01)

(58) Field of Classification Search
CPC ... G02B 21/002; G02B 21/0032; G02B 21/06

USPC ........................................... 359/285, 385, 392
See application file for complete search history.

(56) References Cited

U.S. PATENT DOCUMENTS

| 7,342,219 | B2 | 3/2008 | Araya et al. |
| 2002/0048025 | A1* | 4/2002 | Takaoka ............. G01N 21/4795 356/497 |
| 2007/0205378 | A1 | 9/2007 | Tomioka et al. |

(Continued)

FOREIGN PATENT DOCUMENTS

| EP | 1830215 A1 | 9/2007 |
| EP | 2163935 A1 | 3/2010 |

(Continued)

OTHER PUBLICATIONS

Extended European Search Report dated Dec. 19, 2014, issued in counterpart European Application No. 14173633.0.

*Primary Examiner* — William Choi
(74) *Attorney, Agent, or Firm* — Holtz, Holtz & Volek PC

(57) ABSTRACT

A scanning optical microscope includes a light source, a light converging optical system, a stage, a scanning unit which displaces an illumination light and the stage relatively, a detecting optical system, and a photodetector. A light modulation element and a relay optical system are disposed on the light converging optical system side of the light source, and a modulated signal having only amplitude changed is input to the light modulation element, and the light modulation element is positioned such that the illumination light emerged from the light modulation element with respect to the modulated signal of a predetermined amplitude coincides with an optical axis of the light converging optical system, and a position of a pupil of the light converging optical system and a position of the light modulation element are conjugate through at least the relay optical system.

18 Claims, 9 Drawing Sheets

(51) Int. Cl.
*G02B 21/00* (2006.01)
*G02B 27/42* (2006.01)

(56) References Cited

U.S. PATENT DOCUMENTS

2008/0165358 A1* 7/2008 Engelhardt .................. 356/365
2010/0067103 A1 3/2010 Sangu
2011/0255157 A1 10/2011 Murayama
2013/0335818 A1* 12/2013 Knebel et al. ................ 359/385

FOREIGN PATENT DOCUMENTS

| EP | 2360505 A1 | 8/2011 |
| JP | 2007233241 A | 9/2007 |
| JP | 4729269 B2 | 7/2011 |
| JP | 2011170338 A | 9/2011 |

* cited by examiner

SCANNING OPTICAL MICROSCOPE

CROSS-REFERENCE TO RELATED APPLICATION

The present application is based upon and claims the benefit of priority from the prior Japanese Patent Application No. 2013-131824 filed on Jun. 24, 2013; the entire contents of which are incorporated herein by reference.

BACKGROUND OF THE INVENTION

1. Field of the Invention

The present invention relates to a scanning optical microscope.

2. Description of the Related Art

A scanning laser microscope in which, an acoustic optical element is used has hitherto been known. The acoustic optical element is an element in which, an acoustic optical effect is used. When an acoustic wave is propagate through a solid or a liquid, a periodic fluctuation in a refractive index occurs in that medium due to a photoelastic effect. This periodic fluctuation occurs in parallel to a direction of propagation of the acoustic wave. Moreover, in this periodic fluctuation, a cycle of fluctuation is a wavelength of the acoustic wave. As light is incident on the medium, apart of the light incident is diffracted by an ultrasonic sound wave. This phenomenon is called as the acoustic optical effect.

A principle of operation of the acoustic optical element (such as AOM (acoustic optical modulator), AOTF (acoustic optical tunable filter, and AOD (acoustic optical deflector)) is shown in FIG. 7. In the acoustic optical element, optical crystal such as $LiNbO_3$, $PbMoO_4$, or $TeO_2$ is used as a medium. A transducer that transmits ultrasonic sound waves is attached to the optical crystal. A piezoelectric body is used as the transducer. As a high-frequency voltage (RF (radio frequency) voltage) is applied to the transducer, acoustic waves of high frequency are generated in the crystal. Incident light is caused to be diffracted by using a periodic change of the refractive index due to the acoustic waves, and accordingly, light is caused to be deflected.

The entire incident light that is incident on the acoustic optical element is not diffracted, and first-order diffracted light and transmitted light (non-diffracted light) emerge from the acoustic optical element. By changing the frequency of the high-frequency voltage applied to the acoustic optical element, a direction of deflection of the first-order diffracted light is changed, and by changing amplitude of the high-frequency voltage, a light intensity of the first-order diffracted light changes.

As a scanning laser microscope in which such acoustic optical element is used, a scanning laser microscope disclosed in Japanese Patent Publication No. 4729269 is available.

In the scanning laser microscope disclosed in Japanese Patent Publication No. 4729269, the acoustic optical element is used for modulation of the light intensity. In this scanning laser microscope, the acoustic optical element is disposed between a laser light source and a laser scanning section.

As one of applications in the scanning laser microscope, light stimulus is applied to an observed object (generally, a living cell or a tissue), and a reaction with respect to the light stimulus is subjected to imaging, or an electric potential of the cell is measured. In light stimulus, light of various intensities is irradiated to the observed object.

Moreover, as another application, a portion from a surface to an interior of the observed object is subjected to imaging continuously, and a three-dimensional image is generated from continuous images acquired. In a case of acquiring continuous images, deeper the position in the interior portion of the observed object, at which an image is to be acquired, more is the attenuation of laser light. In order to be able to acquire images of uniform brightness at any position at which the image is acquired, it is necessary to change the light intensity of laser light according to the position at which the image is to be acquired. In view of such circumstances, in the application in which, the light stimulus is to be applied or in the application in which, the three-dimensional image is to be generated, the light intensity is changed, or in other words, modulation of the light intensity is carried out.

In a scanning laser microscope to be used in such applications, an acoustic optical element is used for carrying out modulation of the light intensity as in Japanese Patent Publication No. 4729269. An example of a conventional scanning laser microscope is shown in FIG. 8A and FIG. 8B. FIG. 8A is a diagram showing an arrangement of the scanning laser microscope, and FIG. 8B is a diagram showing laser light at a position of a pupil of an objective.

As shown in FIG. 8A, the scanning laser microscope includes a laser light source 101, an acoustic optical element 102, an optical scanner 103, a pupil projection lens 104, an image forming lens 105, a dichroic mirror 106, a microscope objective 107, and a photodetector 109. If necessary, an excitation filter may be disposed in an optical path from the laser light source 101 up to the optical scanner 103, and a barrier filter (absorption filter) may be disposed in an optical path from the dichroic mirror 106 up to the photodetector 109. Broken-line arrow marks will be described later.

The laser light source 101 is an ultrashort pulse laser for instance. Near-infrared laser light is emitted from the ultrashort pulse laser. Laser light emitted from the laser light source 101 is incident on the acoustic optical element 102. Laser light (first-order diffracted light) emerged from the acoustic optical element 102 is incident on the optical scanner 103. The optical scanner 103 includes two light deflecting elements. The light deflecting element is a galvano scanner for instance. The laser light is deflected in X-direction at a mirror of one of the galvano scanners, and is deflected in Y-direction at a mirror of the other galvano scanner.

The laser light emerged from the optical scanner 103 is incident on the dichroic mirror 106 through the pupil projection lens 104 and the image forming lens 105. The laser light is reflected at the dichroic mirror 106, and is incident on the microscope objective 107 (hereinafter, appropriately called as 'objective 107'). The laser light is converged by the objective 107, and a laser spot is formed on a specimen 108.

The laser spot moves two-dimensionally on the specimen 108 according to the movement of mirrors of the galvano scanners. Accordingly, scanning of the specimen 108 is carried out. Positions of the mirrors of the galvano scanners and a position of a pupil 107a of the objective 107 are substantially conjugate through the pupil projection lens 104 and the image forming lens 105.

In a case in which, the specimen 108 is a fluorescent specimen, fluorescent light is emitted from the specimen 108. The fluorescent light passes through the objective 107 and the dichroic mirror 107, and is incident on the photodetector 109. The fluorescent light incident on the photodetector 109 is converted to an electric signal by the photodetector 109. By performing a sampling of the electric signal output from the photodetector 109 in synchronization with scanning, a fluorescence image of the specimen 108 is acquired.

An illustration of as to how the light stimulus is applied is shown in FIG. 9A, FIG. 9B, and FIG. 9C. FIG. 9A is a diagram showing an appearance of an actual field of view, FIG. 9B is a diagram showing a relationship of a position of a cell, a timing of changing the light intensity, and the light intensity, and FIG. 9C shows an image of an observed object when the light intensity has been changed.

In FIG. 9A, a rectangular area 221 in an actual field of view 220 of a microscope is a scanning area. Cells in the rectangular area 221 are scanned and subjected to imaging. A plurality of cells exists in the rectangular area 221, and here, light stimulus is to be applied to two cells namely a cell A and a cell B.

In FIG. 9B, a cross-sectional view of the cells along a line XX' in FIG. 9A is shown. Moreover, beneath the cross-sectional view, a graph indicating a change in the light intensity in scanning of one line is shown. A vertical axis of the graph is a light intensity I and a horizontal axis of the graph is a scanning time t. As shown in FIG. 9B, the light intensity of laser light irradiated to the cell A and cell B is, 50% of the maximum light intensity for the cell A, and 10% of the maximum light intensity for the cell B. Moreover, scanning of one line is carried out in 1 msec. Therefore, the light intensity is to be changed to 10% or 50% in 1 msec.

In the acoustic optical element 102, the amplitude of the high-frequency voltage applied is changed according to the time elapsed from a start point of scanning of one line (scanning position). Accordingly, an arrangement is made such that laser light of various light intensities are irradiated to the cell A and the cell B.

SUMMARY OF THE INVENTION

A scanning optical microscope according to the present invention includes
  a light source which emits illumination light,
  a light converging optical system which irradiates the illumination light to a specimen,
  a stage on which the specimen is placed,
  a scanning unit which displaces the illumination light and the stage relatively,
  a detecting optical system which collects light from the specimen, and
  a photodetector which detects light from the specimen; and
  a light modulation element and a relay optical system are disposed on the light converging optical system side of the light source, and
  a modulated signal having only amplitude changed, is input to the light modulation element, and
  the light modulation element is positioned such that the illumination light emerged from the light modulation element with respect to the modulated signal of a predetermined amplitude coincides with an optical axis of the light converging optical system, and
  a position of a pupil of the light converging optical system and a position of the light modulation element are conjugate through at least the relay optical system.

Moreover, the scanning optical microscope according to the present invention further includes
  a pupil projection optical system,
  a light deflecting member, and
  a drive unit which inputs a deflection signal to the light deflecting member, and
  the position of the light modulation element and a position of the light deflecting member are conjugate through the relay optical system, and
  the position of the pupil of the light converging optical system and the position of the light deflecting member are conjugate through the pupil projection optical system, and
  an angle of emergence θ of the illumination light emerged from the light modulation element is an angle made by an optical axis of the light converging optical system and the light emerged from the light modulation element, and when the modulated signal of the predetermined amplitude is input to the light modulation element, the angle of emergence θ is, θ=0°, and
  the drive unit has an input section, and
  correction information for deflecting the illumination light incident on the light deflecting member by a predetermined angle is input to the input section, and
  the predetermined angle is an angle which counterbalances the angle of emergence θ of the illumination light when emerged from the light modulation element, and
  the drive unit inputs the modulated signal generated based on the correction information, to the light deflecting member

BRIEF DESCRIPTION OF THE DRAWINGS

FIG. 1A is a diagram showing a scanning optical microscope according to a first embodiment, and FIG. 1B is a diagram showing a scanning optical microscope according to a second embodiment;

FIG. 2A is a diagram showing an arrangement of the scanning laser microscope, FIG. 2B is a diagram showing an appearance of laser light at a pupil position of an objective, and FIG. 2C is a diagram showing an arrangement in which, a beam expander is disposed;

FIG. 3A is a diagram showing an arrangement of the scanning laser microscope, and FIG. 3B is a diagram showing an appearance of laser light at a pupil position of an objective;

FIG. 8A is a diagram showing an arrangement of the scanning laser microscope, and FIG. 8B is a diagram showing an appearance of laser light at a pupil position of an objective; FIG. 9A is a diagram showing an appearance of an actual field of view of a microscope, FIG. 9B is a diagram showing a relationship of a position of a cell, a timing of changing the light intensity, and the light intensity, and FIG. 9C is a diagram showing an image of an observed object when the light intensity is changed.

DETAILED DESCRIPTION OF THE INVENTION

Exemplary embodiments and examples of a scanning optical microscope according to the present invention will be described below by referring to the accompanying diagrams. However, the present invention is not restricted to the embodiments and the examples described below.

Figure 1A:
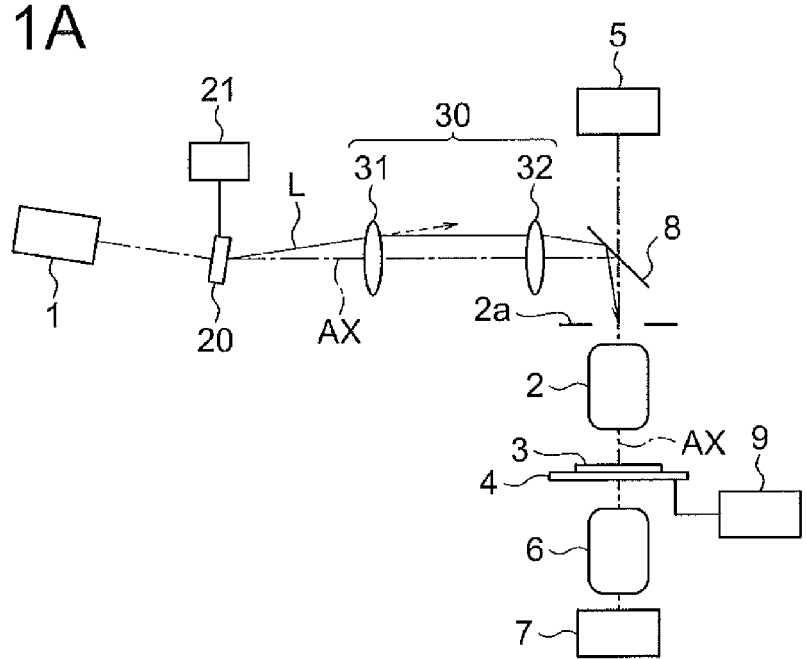
FIG. 1A and FIG. 1B are diagrams showing a scanning optical microscope according to embodiments of the present embodiment, where.
Figure 1B:
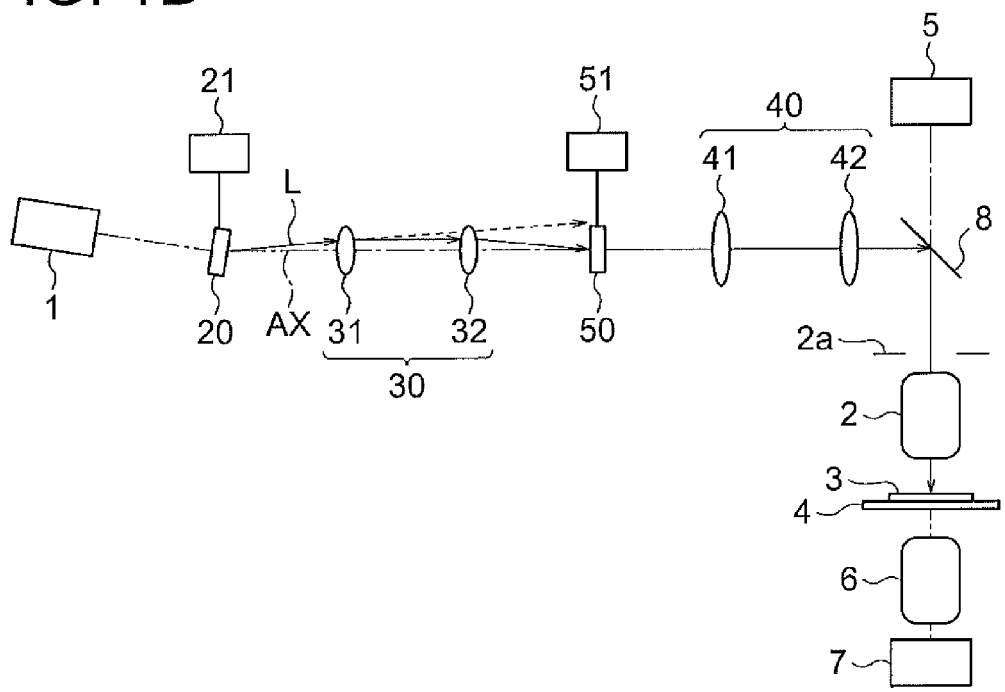

The scanning optical microscope according to the embodiments will be described below. FIG. 1A and FIG. 1B are diagrams showing the scanning optical microscope according to the embodiments, where, FIG. 1A is a diagram showing a scanning optical microscope according to a first embodiment, and FIG. 1B is a diagram showing a scanning optical microscope according to a second embodiment.

In each of FIG. 1A and FIG. 1B, a first arrangement and a second arrangement are shown together. A first arrangement is an arrangement in which, light (such as fluorescence or reflected light) directed in an upward direction of a paper surface from a specimen 3 is detected. The second arrangement is an arrangement in which, light (such as fluorescence and transmitted light) directed in a downward direction of the paper surface from the specimen 3 is detected. The scanning optical microscope according to the embodiments may have at least one of the first arrangement and the second arrangement.

A scanning optical microscope according to the first embodiment will be described below. The scanning optical microscope according to the first embodiment includes a light source 1, a light converging optical system 2, a stage 4, a photodetector 5, a detecting optical system 6, a photodetector 7, and a scanning unit 9. Moreover, a light modulation element 20 and a relay optical system 30 are disposed on the light converging optical system 2 side of the light source 1. The light modulation element 20 and the relay optical system 30 are disposed on an optical axis AX of the light converging optical system 2 (hereinafter, to be called appropriately as 'optical axis AX').

The light source 1 is a laser for instance. The light source 1 may be formed by combining a surface light source, a pinhole, and a lens. Illuminating light is emitted from the light source 1. The illumination light emitted from the light source 1 passes through the light modulation element 20 and the relay optical system 30, and is incident on the light converging optical system 2. Next, illumination light is irradiated to a specimen 3. The light converging optical system 2 is a microscope objective for example. The light modulation element 20 and the relay optical system 30 will be described later.

In the first arrangement, light directed from the light source 1 to the specimen 3 and light directed from the specimen 3 to the photodetector 5 pass through the light converging optical system 2. Therefore, to separate the two lights, an optical element 8 is disposed. The optical element 8 is an element such as a dichroic mirror or a half mirror. Whereas, in the second arrangement, since the light from the specimen 3 does not pass through the light converging optical system 2, the use of optical element 8 is not necessarily required.

The specimen 3 is placed on the stage 4. The illumination light emerged from the light converging optical system 2 is irradiated to the specimen 3. Accordingly, a light spot is formed on the specimen 3. Light (such as fluorescence and reflected light) directed in an upward direction of a paper surface and light (such as fluorescence and transmitted light) directed in a downward direction of the paper surface emerge from the specimen 3.

The light directed in the upward direction of the paper surface is incident on the light converging optical system 2, and is collected by the light converging optical system 2. The collected light passes through the optical element 8, and is detected by the photodetector 5. Whereas, the light directed in the downward direction of the paper surface is incident on the detecting optical system 6, and is collected by the detecting optical system 6. The collected light is detected by the photodetector 7. The detecting optical system 6 is a condenser lens for example. Moreover, the photodetector 5 and the photodetector 7 are a photomultiplier or a photodiode for example.

As mentioned above, the light spot is formed on the specimen 3, and in this state, information of only one point can be acquired. Therefore, in a case of acquiring information of a plurality of points, the stage 4 and the light spot (illumination light) are to be displaced relatively in a plane orthogonal to the optical axis AX of the light converging optical system 2.

For this, the scanning unit 9 is connected to the stage 4. The scanning unit 9 includes a stepping motor and a drive unit of the stepping motor. By moving the stage 4 by the scanning unit 9, it is possible to move a position of the stage 4 (specimen 3) in a state of the light stop at rest. By doing so, information of plurality of points of the specimen 3, such as two-dimensional image of the specimen 3, is obtained.

The stage 4 (specimen 3) may be let to be stationary and the optical spot may be moved. In this case, it is preferable to dispose the scanning unit 9 in an optical path from the light source 1 up to the light converging optical system 2. The scanning unit 9, in this case, is a light deflecting element such as a galvano scanner or an acoustic optical element. At the time of disposing the light deflecting element, the optical system is disposed between the light deflecting element and the light converging optical system 2 such that, a position of the light deflecting element and a position of a pupil $2a$ of the light converging optical system 2 are conjugate. Moreover, scanning by movement of the stage 4 and scanning by movement of the light spot may be used in combination.

Figure 8A:
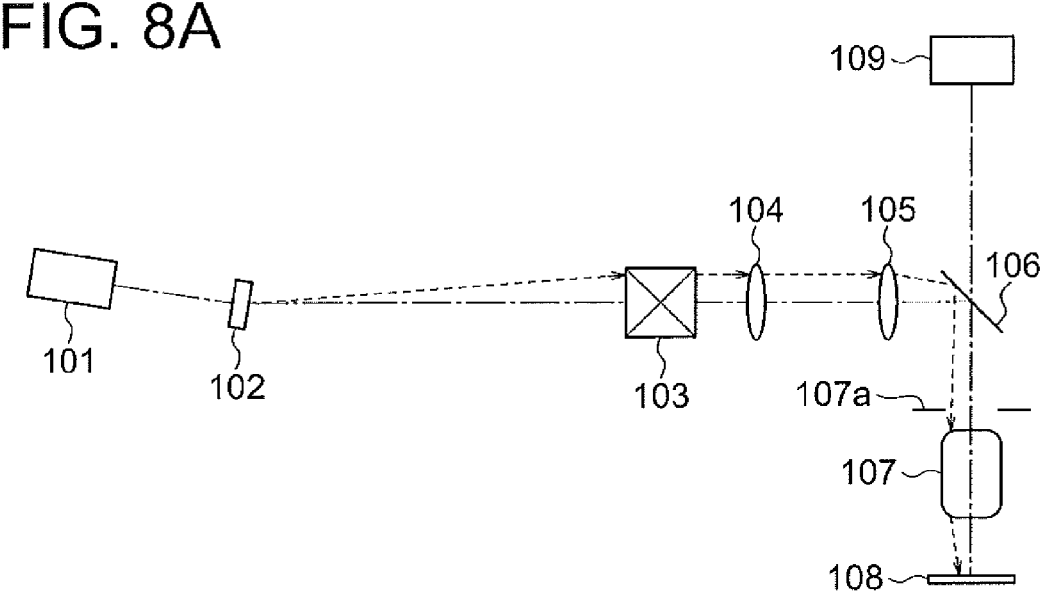
FIG. 8A and FIG. 8B are diagrams showing an example of a conventional scanning laser microscope, where.

Here, before explaining the light modulation element 20 and the relay optical system 30, the change of the light intensity, in the case of using the acoustic optical element 102 shown in FIG. 8A, will be described in a little more detail.

As mentioned above, in the acoustic optical element 102, it is possible to change the light intensity of laser light by changing the amplitude of the high-frequency voltage applied. Heretofore, an angle of emergence of laser light emerged from the acoustic optical element 102 (angle made with an optical axis) was considered to be constant irrespective of the change in the light intensity. However, the applicants of the present patent application found that if the light intensity it changed by changing the amplitude of the high-frequency voltage, the angle of emergence of laser light emerged from the acoustic optical element 102 changes minutely according to the change in the light intensity (change in the amplitude of the high-frequency voltage). The broken-line arrow marks shown in FIG. 8A indicate laser light when the angle of emergence was changed.

For example, the amplitude of the high-frequency voltage applied to the acoustic optical element 102 is set such that laser light having a light intensity 50% of the maximum light intensity (hereinafter, called as '50% laser light') is emerged from the acoustic optical element 102. At this time, the acoustic optical element 102 has been positioned such that the 50% laser light and the optical axis coincide. Due to such positioning, the 50% laser light emerged from the acoustic optical element 102 travels along the optical axis, and is incident on a center of the mirror of the galvano scanner.

Here, by changing the amplitude of the high-frequency voltage applied to the acoustic optical element 102, an arrangement is made such that a laser light having a light intensity 10% of the maximum light intensity (hereinafter, called as '10% laser light') is emerged from the acoustic optical element 102. When such an arrangement is made, the angle of emergence for the 10% laser light changes as shown by the broken-line arrow marks in FIG. 8A. In this case, the 10% laser light is incident at a position away from the center of the mirror of the galvano scanner.

Figure 8B:
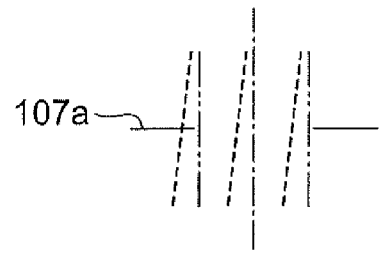

As mentioned above, the mirror of the galvano scanner is conjugate with the pupil 107a of the objective 107. Here, the center of the pupil 107a of the objective 107 and the center of the 50% laser light coincide as shown by alternate long and two short dashes lines in FIG. 8B. Therefore, for the 50% laser light, the entire light beam passes through the pupil 107a of the objective 107. Moreover, even if the laser light is deflected by the optical scanner 103, the entire light beam passes through the pupil 107a of the objective 107. Therefore, in a case in which, a density of fluorochrome is same at any location, in the cell A to which, the 50% laser light was irradiated, there is no unevenness of brightness in an acquired image of the cell A.

Whereas, for the 10% laser light, the center of the pupil 107a of the objective 107 and the center of the 10% laser light do not coincide. Therefore, a part of the light beam passes through the pupil 107a of the objective 107 but the remaining part is not capable of passing through the pupil 107a of the objective 107. Moreover, if the laser light is deflected by the optical scanner 103, an amount of the light beam that cannot pass through the pupil 107a of the objective 107 changes. Therefore, even if the density of fluorochrome is same at any location, in the cell B to which, the 10% laser light was irradiated, there is an unevenness of brightness in an acquired image of the cell B.

In such manner, in the conventional scanning laser microscope, if the light intensity is changed by the acoustic optical element, the center of the laser light with respect to the center of the pupil 107a of the objective 107 differs between before and after the change of the light intensity.

Moreover, as mentioned above, the 50% laser light emerged from the acoustic optical element 102 travels along the optical axis. Therefore, in a state of the scanning not being started, at a position of the specimen 108, the 50% laser light is irradiated along the optical axis. As a result, a laser spot of the 50% laser light is formed at the center of the actual field of view. Whereas, the 10% laser light emerged from the acoustic optical element 102 travels in a direction intersecting the optical axis. Therefore, in a state of the scanning not being started, at the position of the specimen 108, the 10% laser light is irradiated to a position away from the optical axis. As a result, a laser spot of the 10% laser light is formed at a position shifted from the center of the actual field of view. In FIG. 8A, only the position at which the 10% laser light is irradiated is indicated by broken-line arrow marks.

Figure 9A:
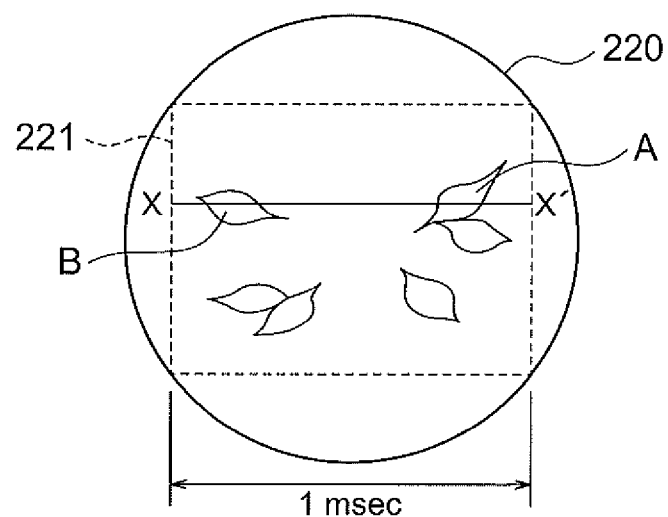
FIG. 9A, FIG. 9B, and FIG. 9C are diagrams showing as to how a light stimulus is applied, where.

An example of scanning along XX' in FIG. 9A will be described below. At the time of start of scanning, the light intensity of laser light is zero. As the scanning starts, the laser spot moves and reaches a left edge of the cell B. Here, the light intensity of the laser light is changed. At this time, in a case in which, the laser light after the light intensity is changed is the 50% laser light, since the position of the laser spot does not change, the 50% laser light is irradiated to the left edge of the cell B.

Figure 9B:
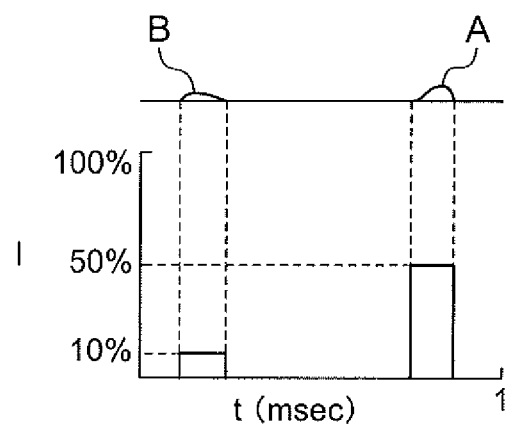
Figure 9C:
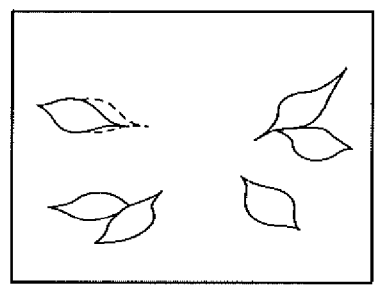

However, as shown in FIG. 9B, the 10% laser light is irradiated to the cell B. Therefore, the position of the laser spot changes from the original irradiation position, or in other words, changes to a position shifted from a left edge of the cell B. As a result, in the cell B, an acquired image of the cell B (broken lines) is displayed at a position shifted from the original position (solid lines) as shown in FIG. 9C. Whereas, since the 50% laser light is irradiated to the cell A, the position of the laser spot is displayed at the original irradiation position. Therefore, an acquired image of the cell A is displayed at the original position.

In such manner, in the conventional scanning laser microscope, if the light intensity is changed by the acoustic optical element 12, an angle of incidence of laser light that is incident on the pupil 107a of the objective 107 differs between before and after the change of the light intensity.

Particularly, the ultrashort pulse laser is large-sized. Therefore, in a scanning laser microscope using the ultrashort pulse laser, the ultrashort pulse laser, the optical scanner, and the microscope are placed on a large-size vibration-free pedestal. Here, in a case in which, the microscope is an upright microscope, a distance from the ultrashort pulse laser up to the galvano scanner (scanner) surpasses 1 m. Therefore, even if the change in the angle of emergence of laser light emerged from the acoustic optical element is slight, a position at which, the laser light is incident on the galvano scanner is shifted substantially from the center of the mirror of the galvano scanner.

The position of incidence of the laser light is shifted from the mirror of the galvano scanner means that the center of the pupil of the objective and the center of the laser light do not coincide. In this case, the unevenness in brightness of image becomes substantial, and the shift from the original position of the image becomes large.

For instance, in a case in which, a size of the mirror of the galvano scanner is 4 mm, and the distance from the ultrashort pulse laser up to the galvano scanner (scanner) is 1.5 m, if the angle of emergence of laser light emerged from the acoustic optical element changes by 200 arc seconds, at a position of the mirror of the galvano scanner, the laser light is shifted by 1.5 mm from the center of the mirror of the galvano scanner.

Here, in the scanning laser microscope disclosed in Japanese Patent Publication No. 4729269, the acoustic optical element is used for modulation of the light intensity. However, even in Japanese Patent Publication No. 4729269, there has been no mention at all of a point that if the light intensity is changed by changing the amplitude of the high-frequency voltage, the angle of emergence of the laser light emerged from the acoustic optical element changes minutely according to the change in the light intensity.

A beam shifter has been disclosed in Japanese Patent Publication No. 4729269. In this beam shifter, a parallel movement and a change in angle of laser light are possible. Since the beam shifter includes two plane mirrors, the parallel movement and the change in the angle of laser light are carried out by mechanical operation. Here, as shown in FIG. 9A and FIG. 9B, in a case of carrying out scanning of one line in 1 msec, it is necessary to carry out correction of the angle change in order of micro seconds. However, in the beam shifter disclosed in Japanese Patent Publication 4729269, the plane mirrors are moved by a motor. Therefore, it is difficult to carry out the angle change in order of micro seconds in the beam shifter disclosed in Japanese Patent Publication 4729269.

On the basis of prior art described above, the scanning optical microscope according to the present embodiment will be described.

The light modulation element 20 and the relay optical system 30 will be described below. The light modulation element 20 is an element such as an acoustic optical element or an electro-optic element. A drive unit 21 is connected to the light modulation element 20. In a case in which, the light modulation element 20 is an acoustic optical element, a modulated signal, or in other words, a high-frequency voltage, is input to the light modulation element 20 from the drive unit 21. However, in the scanning optical microscope according to the present embodiment, the modulated signal is a signal in which, only the amplitude is changed. In other words, the frequency of the modulated signal that is input is constant.

In the light modulation element 20, by changing the amplitude of the modulated signal (high-frequency voltage), it is possible to change the light intensity of the illumination light emerged from the light modulation element 20. The light modulation element 20 is positioned such that, the illumination light emerged from the light modulation element 20 with respect to the modulated signal with a predetermined amplitude coincides with the optical axis AX. Accordingly, when the modulated signal with the predetermined amplitude is input to the light modulation element 20, the illumination light emerged from the light modulation element 20 travels along the optical axis AX.

Here, if the amplitude of the modulated signal is changed to an amplitude different from the predetermined amplitude, the light intensity of the illumination light emerged from the light modulation element 20 changes, and simultaneously, as shown by a solid line L, an angle of emergence of the illumination light emerged from the light modulation element 20 also changes minutely. If this state is left as it is, a center of the illumination light with respect to a center of the pupil 2a of the light converging optical system 2 before changing the light intensity differs from the center of the illumination light with respect to the center of the pupil 2a of the light converging optical system 2 after the light intensity is changed.

Therefore, in the scanning optical microscope according to the first embodiment, the relay optical system 30 is disposed on the light converging optical system 2 side of the light modulation element 20. The relay optical system 30 includes a lens 31 and a lens 32. Here, in the relay optical system 30, the lens 31, the lens 32, the light modulation element 20, and the light converging optical system 2 (position of the pupil 2a) are positioned such that the following conditions (I), (II), and (III) are satisfied. (I) A front focal point of the lens 31 and the position of the light modulation element 20 coincide, (II) a rear focal point of the lens 31 and a front focal point of the lens 32 coincide, and (III) a rear focal point of the lens 32 and the position of the pupil 2a of the light converging optical system 2 coincide. Accordingly, the position of the light converging optical system 2 and the position of the light modulation element 20 are conjugate through the relay optical system 30.

When such an arrangement is made, the illumination light (solid line L) emerged from the light modulation element 20 is refracted by the lens 31, and travels parallel to the optical axis AX. The illumination light is refracted by the lens 32 in a direction intersecting with the optical axis AX, and reaches the pupil 2a of the light converging optical system 2. Here, as mentioned above, the position of the pupil 2a of the light converging optical system 2 and the position of the light modulation element 20 are conjugate through the relay optical system 30. Therefore, a center of the illumination light that has reached the pupil 2a of the light converging optical system 2 coincides with a center of the pupil 2a of the light converging optical system 2. Therefore, the entire light beam of the illumination light passes through the pupil 2a of the light converging optical system 2.

In such manner, in the scanning optical microscope according to the first embodiment, even if the light intensity is changed by the light modulation element 20, the center of the illumination light with respect to the center of the pupil 2a of the light converging optical system 2 before changing the light intensity does not change the center of the illumination light with respect to the center of the pupil 2a of the light converging optical system 2 after the light intensity is changed. As a result, in the scanning optical microscope according to the first embodiment, even when the light intensity is changed by the light modulation element 20, there is no difference in brightness between an acquired image before changing the light intensity and an acquired image after the light intensity is changed. Moreover, in a case in which, optical scanning has been carried out, there is no unevenness of brightness in the acquired image after the change.

A focal length of the lens 31 and a focal length of the lens 32 may be same or may be different. If the focal length of the lens 32 is made longer than the focal length of the lens 31, the relay optical system 30 becomes a magnifying optical system. When such an arrangement is made, it is possible to make an angle of emergence of the illumination light emerging from the lens 32 small, and besides, it is also possible to make a diameter of the light beam large.

Moreover, an optical system in addition to the relay optical system 30 may be provided, and an arrangement may be made such that with the relay optical system 30 and the additional optical system provided, the position of the pupil 2a of the light converging optical system 2 and the position of the light modulation element 20 become conjugate.

Next, the scanning optical microscope according to the second embodiment will be described below. As shown in FIG. 1B, the scanning optical microscope according to the second embodiment has an arrangement of the scanning optical microscope according to the first embodiment, and further includes a pupil projection optical system 40, a light deflecting member 50, and a drive unit 51. Therefore, the description of an arrangement which is same as the arrangement of the scanning optical microscope according to the first embodiment is omitted.

Even in the following description, the light modulation element 20 will be described as an acoustic optical element. Moreover, as the light deflecting member 50, members such as a galvano scanner, an acoustic optical element, and a polygon scanner are available, and here, the light deflecting member 50 will be described as the acoustic optical element. In FIG. 1B, for the sake of expediency, the light deflecting member 50 is disposed to be orthogonal to an optical axis. Moreover, an optical axis on two sides of the light deflecting member 50 is also drawn to be collinear. However, practically, a direction of an arrangement of the light deflecting member 50 with respect to the optical axis, and a direction of the optical axis on two sides of the light deflecting member 50 are similar to respective directions for the light modulation element 20.

Even in the scanning optical microscope according to the second embodiment, the light modulation element 20 is positioned such that the illumination light emerged from the light modulation element 20 with respect to a modulated signal of a predetermined amplitude coincides with the optical axis AX. Accordingly, when the modulated signal of the predetermined amplitude is input to the light modulation element 20, the illumination light emerged from the light modulation element 20 travels along the optical axis AX.

Here, when the amplitude of the modulated signal is changed to an amplitude different from the predetermined amplitude, the light intensity of the illumination light emerged from the light modulation element 20 changes, and simultaneously, as shown by a solid line L, an angle of emergence of the illumination light emerged from the light modulation element 20 also changes minutely. Here, an angle of emergence $\theta$ is an angle made by the optical axis AX and the illumination light emerged from the light modulation element 20. With respect to the modulated signal having the predetermined amplitude, since the illumination light emerged from the light modulation element 20 coincides with the optical axis AX, when the modulated signal having the predetermined amplitude is input to the light modulation element 20, the angle of emergence θ is θ=0°.

Whereas, in a case in which, a modulated signal having an amplitude different from the predetermined amplitude is input to the light modulation element 20, the angle of emergence θ is θ≠0°. In this case, illumination light emerged with the angle of emergence θ from the light modulation element 20 is refracted as shown by a solid line L by the lens 31, and travels parallel to the optical axis. Moreover, the illumination light is refracted in a direction intersecting the optical axis AX by the lens 32, and reaches the light deflecting member 50.

Here, the position of the light modulation element 20 and a position of the light deflecting member 50 are conjugate through the relay optical system 30. Therefore, a center of the illumination light that has reached the light deflecting member 50 coincides with a center of an opening of the light deflecting member 50. However, for the illumination light indicates by the solid line L, the angle of emergence θ when emerged from the light modulation element 20 is maintained. Therefore, even in the pupil 2a of the light converging optical system 2, the illumination light travels in a direction intersects with the optical axis AX. Also, in a case of a galvano scanner, the center of the opening of the light deflecting member 50 is a center of a mirror of a galvano scanner, and in a case of an acoustic optical element, the center of the opening of the light deflecting member 50 is a center of an opening portion on an incident-light side of an acoustic optical element, for example.

Consequently, in the scanning optical microscope according to the second embodiment, an input section is provided to the drive unit 51, and an arrangement is made such that correction information for deflecting the illumination light incident on the light deflecting member 50 by a predetermined angle is input to the input section of the drive unit 51. Moreover, an arrangement is made such that the drive unit 51 inputs a deflection signal that is generated based on the correction information, to the light deflecting member 50. Here, the predetermined angle is an angle that counterbalances the angle of emergence θ when emerged from the light modulation element 20.

In FIG. 1B, magnification of the relay optical system 30 is let to be one time and the angle is to be measured from the optical axis AX. Moreover, for the angle, a counterclockwise direction is let to be plus. Here, if the angle of emergence θ of illumination light L in FIG. 1B is let to be θ=1°, since the predetermined angle is an angle that counterbalances the angle θ=1°, when expressed in terms of the angle of emergence θ, θ=−1°.

By making such an arrangement, even if the angle of emergence θ is changed in accordance with the change in the light intensity (change in the amplitude of the modulated signal), correction information which counterbalances the change is input to the drive unit 51. As a result, it is possible to make an arrangement such that the illumination light emerged from the light deflecting member 50 is emerged to coincide with the optical axis AX all the time even if the light intensity is changed. In other words, even if the amplitude of the modulated signal which is input to the light modulation element 20 is the predetermined amplitude, or is different from the predetermined amplitude, the angle of emergence (angle made with the optical axis AX) of the illumination light emerged from the light deflecting member 50 coincides substantially.

Moreover, in the scanning optical microscope according to the second embodiment, the pupil projection optical system 40 is disposed between the light deflecting member 50 and the light converging optical system 2. The pupil projection optical system 40 includes a pupil projection lens 41 and an image forming lens 42. The illumination light emerged from the light deflecting member 50 passes through the pupil projection lens 41 and the image forming lens 42, and reaches the position of the pupil 2a of the light converging optical system 2.

Here, the position of the pupil 2a of the light converging optical system 2 and the position of the light deflecting member 50 are conjugate through the pupil projection optical system 40. Therefore, the center of the illumination light emerged from the light deflecting member 50 and the center of the pupil 2a of the light converging optical system 2 coincide. Therefore, the illumination light emerged from the light deflecting member 50 travels on the optical axis AX even when passing through the pupil 2a of the light converging optical system 2. In other words, even if the amplitude of the modulated signal input to the light modulation element 20 is the predetermined amplitude, or is different from the predetermined amplitude, the angle of emergence (angle made with the optical axis AX) of the illumination light in the pupil 2a of the light converging optical system 2 coincides substantially.

In such manner, in the scanning optical microscope according to the second embodiment, even if the light intensity is changed by the light modulation element 20, the center of the illumination light with respect to the center of the pupil 2a of the light converging optical system 2 does not change between before and after the change of the light intensity, and besides, the angle of incidence of the illumination light incident on the pupil 2a of the light converging optical system 2 does not change between before and after the change of the light intensity. In other words, even if the light intensity is changed by the light modulation element 20, the position at which the illumination light is radiated does not change between before and after the change of the light intensity.

As a result, in the scanning optical microscope according to the second embodiment, even if the light intensity is changed by the light modulation element 20, there is no difference in brightness of the acquired image between before and after the change of the light intensity, and besides, there is no shift in the acquired image after the light intensity is changed. Moreover, in a case in which, the scanning is carried out by the illumination light, there is no difference in the position of the acquired image after the light intensity is changed, and besides, there is no unevenness of brightness in the acquired image after the light intensity is changed.

As the correction information to be input to the drive unit 51, information such as information based on the drive signal of the drive unit 21 or information based on a position signal when the position of the light beam L has been detected are available. Moreover, the information may be input to the drive unit 51 directly, or the information may be stored in a storage unit, and the information read out from the storage unit may be input to the drive unit 51.

Moreover, in a case of using a galvano scanner as the light deflecting member 50, it is preferable to make an arrangement such that an optical path on the relay optical system 30 side and an optical path on the pupil projection optical system 40 side intersect at a position of a mirror of the galvano scanner. Similar is a case for a polygon scanner.

Figure 2A:
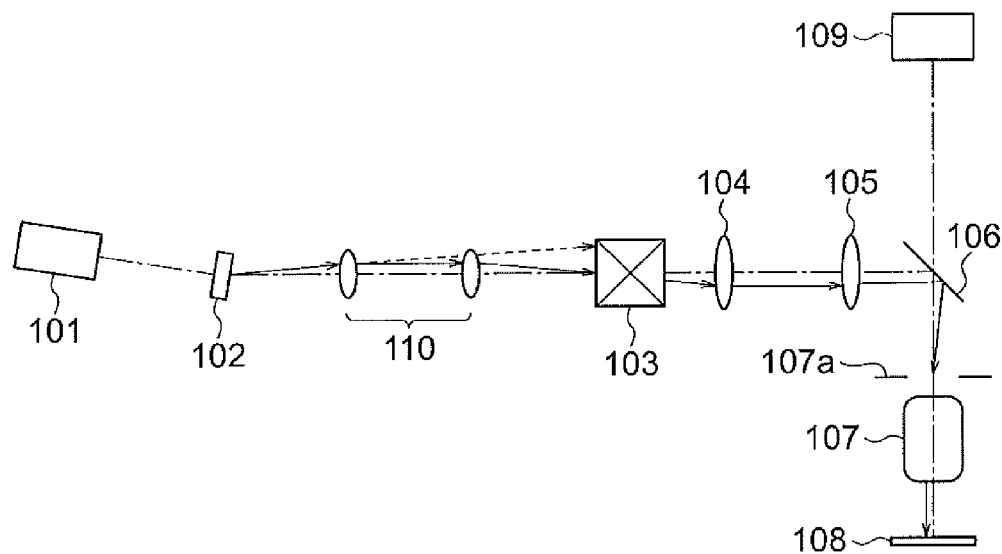
FIG. 2A, FIG. 2B, and FIG. 2C are diagrams showing a scanning laser microscope according to a first example, where.

Next, a more specific arrangement of the scanning optical microscope according to the present embodiment will be described below. Same reference numerals are assigned to components which are same as in FIG. 1A, and description in detail thereof is omitted. FIG. 2A is a diagram showing a scanning laser microscope according to a first example, FIG.

Figure 2B:
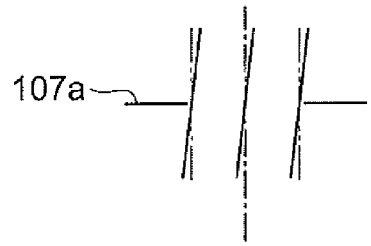
Figure 2C:
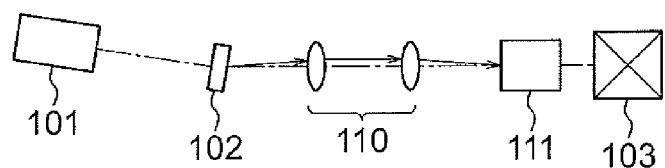

2A is a diagram showing an appearance of laser light at a position of a pupil of an objective, and FIG. 2C is a diagram showing an arrangement in which, a beam expander is disposed.

The scanning laser microscope according to the first example, as shown in FIG. 2A, includes a laser light source 101, an acoustic optical element 102, an optical scanner 103, a pupil projection lens 104, an image forming lens 105, a dichroic mirror 106, an objective 107, and a photodetector 109. The optical scanner 103 consists of a galvano scanner.

The optical scanner 103 is the light deflecting member 50 in FIG. 1B, for example. Here, the galvano scanner of the optical scanner 103 is a light deflecting element. Therefore, the light deflecting element of the optical scanner 103 also functions as the light deflecting member A drive unit is connected to each of the acoustic optical element 102 and the optical scanner 103, but omitted in the diagram. Moreover, although it is not shown in the diagram, an excitation filter is disposed in an optical path from the laser light source 101 up to the optical scanner 103, and a barrier filter (absorption filter) is disposed in an optical path from the dichroic mirror 106 up to the photodetector 109.

The scanning laser microscope according to the first example further includes a relay optical system 110. A concrete arrangement and technical significance of the relay optical system 110 are same as the concrete arrangement and the technical significance of the relay optical system 30 in FIG. 1A and FIG. 1B.

The laser light source 101 is an ultrashort pulse laser for example. Laser light emitted from the laser light source 101 is incident on the acoustic optical element 102. A high-frequency voltage having only amplitude changed is applied to the acoustic optical element 102. By changing the amplitude of the high-frequency voltage, it is possible to change the light intensity of the laser light emerged from the acoustic optical element 102.

A high-frequency voltage having a first amplitude and a high-frequency voltage having a second amplitude are applied to the acoustic optical element 102. The high-frequency voltage having the first amplitude is a voltage for making emerge 50% laser light. Moreover, the high-frequency voltage having the second amplitude is a voltage for making emerge 10% laser light. As the high-frequency voltage having the first amplitude is applied to the acoustic optical element 102, the 50% laser light is emerged from the acoustic optical element 102. If the amplitude of the high-frequency voltage is changed from the first amplitude to the second amplitude, the 10% laser light is emerged from the acoustic optical element 102.

Here, the acoustic optical element 102 is positioned such that the 50% laser light (laser light having light intensity which is 50% of the maximum light intensity) emerged from the acoustic optical element 102 coincides with the optical axis. In such state, only the amplitude of the high-frequency voltage is to be changed. For instance, the amplitude of the high-frequency voltage is to be changed from the first amplitude to the second amplitude such that the 10% laser light (laser light having light intensity which is 10% of the maximum light intensity) is emerged from the acoustic optical element 102.

As the amplitude is changed, the angle of emergence changes for the 10% laser light. Here, in the scanning laser microscope according to the first example, the relay optical system 110 is disposed between the acoustic optical element 102 and the optical scanner 103.

Therefore, the 10% laser light emerged from the acoustic optical element 102 as shown by a solid line, is refracted by a first lens, and travels parallel to the optical axis. Moreover, the laser light is refracted by the second lens in a direction of intersecting the optical axis, and reaches the optical scanner 103. The mirror of the galvano scanner is disposed at a position where the laser light has reached. Here, a position of the acoustic optical element 102 and a position of the optical scanner 103 are conjugate through the relay optical system 110. Therefore, a center of the 10% laser light coincides with a center of the mirror of the galvano scanner.

The 10% laser light emerged from the optical scanner 103 passes through the pupil projection optical system, or in other words, the pupil projection lens 104 and the image forming lens 105, and reaches a pupil 107a of the objective 107. Here, the position of the optical scanner 103 and a position of the pupil 107a of the objective 107 are conjugate through the pupil projection lens 104 and the image forming lens 105. Therefore, as shown by solid lines in FIG. 2B, the center (solid line) of the 10% laser light coincides with a center of the pupil 107a of the objective 107. Also, alternate long and two short dashes lines indicate the 50% laser light.

In such manner, in the scanning laser microscope according to the first example, the position of the acoustic optical element 102 and the position of the pupil 107a of the objective 107 are conjugate through the relay optical system 110 and the pupil projection optical system. Therefore, even if the light intensity of the laser light is changed by the acoustic optical element 102, the center of the laser light with respect to the center of the pupil 107a of the objective 107 does not change between before and after the change of light intensity. As a result, in the scanning laser microscope according to the first example, even if the light intensity of the laser light is changed by the acoustic optical element 102, there is no unevenness in brightness of an acquired image after the light intensity is changed.

In a case in which, the optical scanner 103 consists of two galvano scanners, a position of a mirror of one of the galvano scanners and the position of the acoustic optical element 102 are let to be conjugate through the relay optical system 110. Moreover, a position of a mirror of the other galvano scanner and the position of the pupil 107a of the objective 107 are let to be conjugate through the pupil projection optical system. Furthermore, it is preferable to provide an optical system between the mirrors of the two galvano scanners, and to let the mirrors of the two galvano scanners to be conjugate. By making such an arrangement, it is possible to let the position of the acoustic optical element 102 and the position of the pupil 107a of the objective 107 to be conjugate.

Moreover, in an arrangement in which, no optical system is provided between the mirrors of the two galvano scanners, or in other words, in a case of an arrangement in which the two mirrors are to be brought closer, it is preferable to make an arrangement such that any arbitrary position between the two mirrors becomes conjugate with the position of the acoustic optical element 102 or with the position of the pupil 107a of the objective 107.

Moreover, it is preferable to let a magnification of the relay optical system 110 to be appropriate magnification, taking into consideration the optical scanner 103, the pupil projection lens 104, the image forming lens 105, and the objective 107.

Moreover, it is preferable to dispose a beam expander 111 on the objective 107 side of the relay objective system 110, or more specifically between the relay optical system 110 and the optical scanner 103 as shown in FIG. 2C. By doing so, an arrangement may be made such that at the position of the pupil 107a of the objective 107, a diameter of the laser light and a diameter of the pupil 107a of the objective 107 coincide substantially as shown in FIG. 2B.

Moreover, by letting the beam expander 111 to be an afocal zoom lens, it is possible to change a diameter of a beam of laser light emerged from the beam expander 111. Therefore, even if the objective to be used is changed, at a position of a pupil of an objective, it is possible to let the diameter of the laser light and a diameter of the pupil of the objective to be substantially same.

Figure 3A:
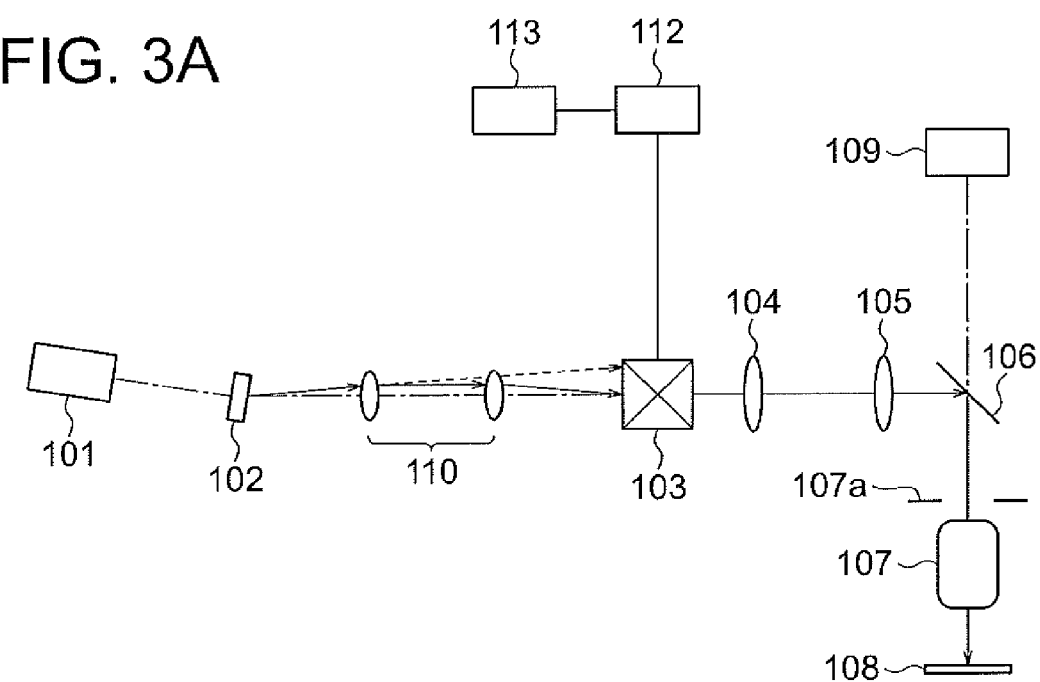
FIG. 3A and FIG. 3B are diagrams showing a scanning laser microscope according to a second example, where.
Figure 3B:
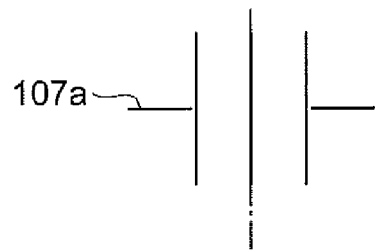

FIG. 3A and FIG. 3B are diagrams showing a scanning laser microscope according to a second example, where, FIG. 3A is a diagram showing an arrangement of the scanning laser microscope, and FIG. 3B is a diagram showing an appearance of laser light at a position of a pupil of an objective.

The scanning laser microscope according to the second example includes, in addition to the arrangement of the scanning laser microscope according to the first example, a drive unit 112 and a storage unit 113. In FIG. 3A, a drive unit of the acoustic optical element 102 is omitted, and also in diagrams of a third example, a fourth example, and a fifth example to be described later, the drive unit is omitted.

The scanning laser microscope according to the second example, similarly as the scanning laser microscope according to the first example, includes the relay optical system 110. Accordingly, even if the laser light emerged from the acoustic optical element 102 is changed to the 10% laser light from the 50% laser light, the center of the 10% laser light coincides with the center of the mirror of the galvano scanner. However, for the 10% laser light, the angle of emergence θ when emerged from the acoustic optical element 102 is maintained.

Therefore, in the scanning laser microscope according to the second example, an input section is provided to the drive unit 112, and an arrangement is made such that correction information for making the illumination light incident on the optical scanner 103 emerge at a predetermined angle, is input to the input section of the drive unit 112. The correction information is stored in advance in the storage section 113.

It is preferable to acquire the correction information at the time of assembling the scanning laser microscope. At the time of assembling, the amplitude of the modulated signal applied to the acoustic optical element 102 is changed continuously, and the angle of emergence of light emerged from the acoustic optical element 102 for each amplitude, is to be measured. Moreover, it is preferable to store the result of the measurement in the storage unit 113 as the correction information.

As the amplitude of the high-frequency voltage input to the acoustic optical element 102 is changed from the first amplitude to the second amplitude, the laser light emerged from the acoustic optical element 102 changes from the 50% laser light to the 10% laser light. Information of the second amplitude is transmitted to the storage unit 113 by wired or wireless transmission. In the storage unit 113, the correction information corresponding to the second amplitude is extracted, and the correction information extracted is transmitted to the drive unit 112 by wired or wireless transmission.

The drive unit 112 generates a deflection signal based on the correction information. The deflection signal generated is input to the optical scanner 103. The optical scanner 130 changes a direction of the mirror of the galvano scanner based on the deflection signal that has been input.

Here, if the angle of emergence of the 10% laser light emerged from the acoustic optical element 102 is let to be θ, the predetermined angle is an angle at which, the angle of emergence of the 10% laser light emerged from the acoustic optical element 102 becomes −θ. In a case in which, the magnification of the relay optical system 110 is one time, the 10% laser light making an angle θ with the optical axis is incident on the galvano scanner of the optical scanner 103. Therefore, the deflection signal input to the optical scanner 103 becomes a signal which deflects the mirror of the galvano scanner by θ/2. The direction in which the mirror is to be deflected is determined according to a sign of θ.

In such manner, in the scanning laser microscope according to the second example, even if the light intensity is changed by the acoustic optical element 102, the center of the laser light with respect to the center of the pupil 107a of the objective 107 does not change between before and after the change of light intensity, and besides, the angle of incident of the laser light incident on the pupil 107a of the objective 107 does not change between before and after the change of light intensity. In other words, even if the light intensity is changed by the acoustic optical element 102, a position at which the laser light is irradiated does not change between before and after the change of light intensity.

As a result, in the scanning laser microscope according to the second example, even if the light intensity is changed by the acoustic optical element 102, there is no difference in brightness between an acquired image before the change and an acquired image after the change. Besides, there is not shift in a position of the acquired image after the change. Moreover, there is no unevenness of brightness in the acquired image after the change.

Furthermore, since the scanning laser microscope according to the second embodiment includes the storage unit 113, it is possible to hold a large amount of correction information. For instance, by using an interpolating method, more detailed correction information is acquired from correction information that has been acquired at the time of assembling the scanning laser microscope. Moreover, it is possible to keep the correction information stored in the storage unit 113. By making such an arrangement, it is possible to carry out correction with respect to a fluctuation in the angle of emergence when the light intensity has been changed, with even higher accuracy.

In the deflection of light in the acoustic optical element, the deflection is not carried out mechanically. Therefore, if the scanner 103 consists of an acoustic optical element, it is possible to carry out the correction of the fluctuation in the angle of emergence when the light intensity has been changed, in even shorter time.

Figure 4:
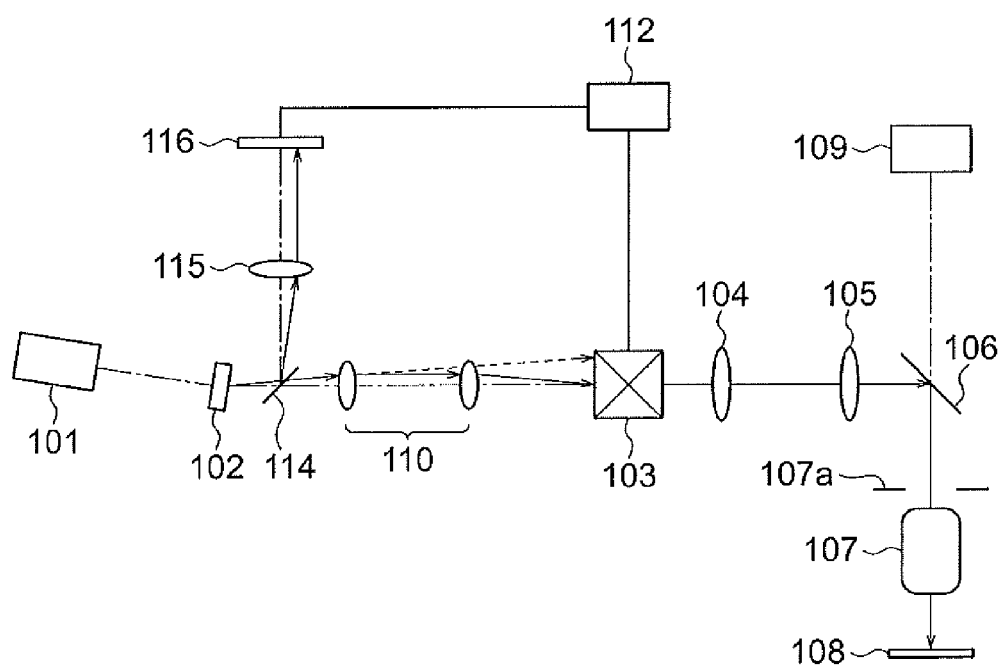
FIG. 4 is a diagram showing a scanning laser microscope according to a third example.

FIG. 4 is a diagram showing a scanning laser microscope according to the third example. The scanning laser microscope according to the third example, includes in addition to the arrangement of the scanning laser microscope according to the first example, the drive unit 112, a beam splitter 114, a lens 115, and an optical position detector 116. The lens 115 is used if necessary.

The optical position detector 116 is a detector such as a two-dimensional CCD (charge coupled device) or a two-dimensional PSD (position sensitive detector). It is preferable that the beam splitter 114 is disposed between the acoustic optical element 102 and the optical scanner 103. In the scanning laser microscope according to the third example, the beam splitter 114 is disposed between the acoustic optical element 102 and the relay optical system 110.

The scanning laser microscope according to the third example, similarly as the scanning laser microscope according to the first example, includes the relay optical system 110. Therefore, even if the laser light emerged from the acoustic optical element 102 is changed from the 50% laser light to the 10% laser light, the center of the 10% laser light coincides with the center of the mirror of the galvano scanner. However, in the scanning laser microscope according to the first example, for the 10% laser light, the angle of emergence θ when emerged from the acoustic optical element 102 is maintained. Therefore, the 10% laser light travels in a direction intersecting with the optical axis.

Therefore, in the scanning laser microscope according to the third example, the laser light emerged from the acoustic optical element 102 is divided into reflected light and transmitted light by the beam splitter 114, and the reflected laser light is made to be incident on the optical position detector 116 through the lens 115. Moreover, a correction signal is generated based on a detection signal that has been output from the optical position detector 116, and the correction signal that has been generated is used as the correction information.

The angle of emergence of the laser light emerged from the acoustic optical element 102 differs for the 50% laser light and the 10% laser light. Therefore, a position of the laser light incident on the optical position detector 116 also differs for the 50% laser light and the 10% laser light. So an arrangement is made such that the 50% laser light is incident at a center of the optical position detector 116. In this case, when the 50% laser light is incident on the optical position detector 116, the detection signal that has been output from the optical position detector 116 becomes 0.

Next, if the laser emerged from the acoustic optical element 102 is changed from the 50% laser light to the 10% laser light, the 10% laser light is incident on the optical position detector 116. In this case, the 10% laser light is incident at a position shifted from the center of the optical position detector 116. As a result, the detection signal that has been output from the optical position detector 116 has a value corresponding to a position of incidence.

The detection signal that has been output from the optical position detector 116 is equivalent to the angle of emergence θ of the 10% laser light emerged from the acoustic optical element 102. Therefore, the correction signal is generated based on the detection signal. Since the optical position detector 116 includes a detector circuit (not shown in the diagram), it is possible to generate the correction signal by the detector circuit. Or, another circuit, other than the detector circuit, may be provided, and the correction signal may be generated by another circuit. Moreover, it is preferable to use the correction signal as the correction information.

The drive unit 112 generates the deflection signal based on the correction information. The deflection signal that has been generated is input to the optical scanner 103. The optical scanner 103 changes the direction of the mirror of the galvano scanner based on the deflection signal that has been input.

Even in the scanning laser microscope according to the third example, an effect similar to an effect of the scanning laser microscope according to the second example is shown. Moreover, in the scanning laser microscope according to the third embodiment, the correction signal (correction information) is generated by using the laser light emitted from the acoustic optical element 102. Therefore, even in a case in which, the angle of emergence θ has changed with the elapsing of time, it is possible to carry out correction of the fluctuation in the angle of emergence when the light intensity has been changed, with even higher accuracy.

Figure 5:
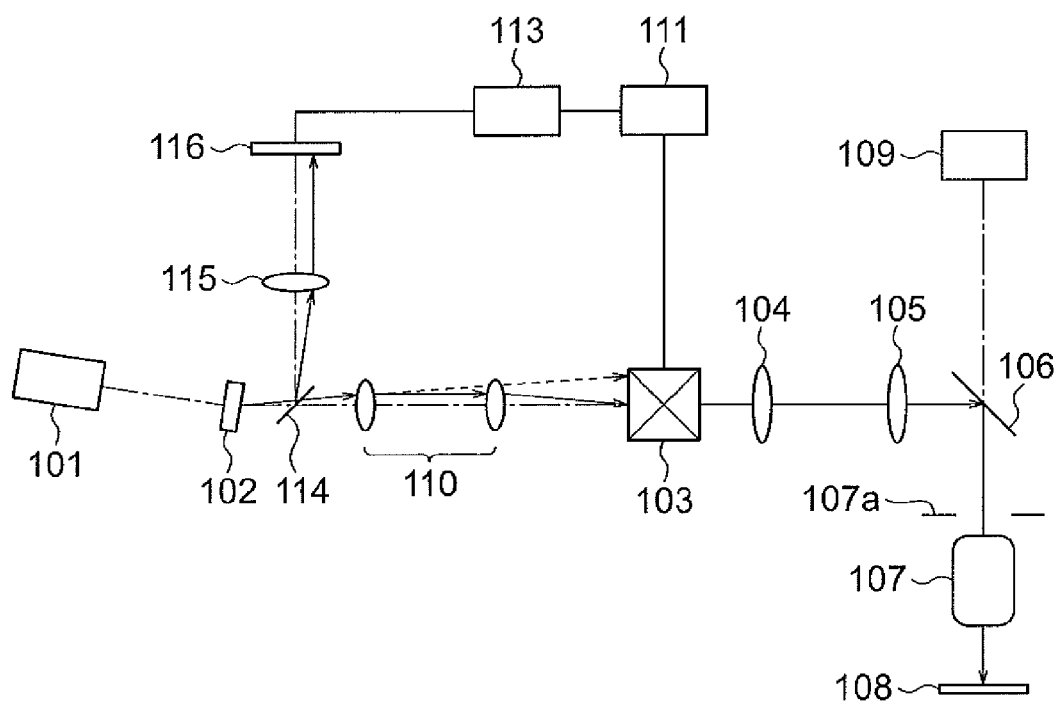
FIG. 5 is a diagram showing a scanning laser microscope according to a fourth example.

FIG. 5 is a diagram showing a scanning laser microscope according to the fourth example. The scanning laser microscope according to the fourth example includes, in addition to the arrangement of the scanning laser microscope according to the third embodiment, the storage unit 113.

In the scanning laser microscope according to the third example, the correction signal is generated based on the detection signal that has been output from the optical position detector 116. Moreover, the correction signal generated is input directly to the input section of the drive unit 112 as the correction information. Whereas, in the scanning laser microscope according to the fourth example, the correction signal may be stored in the storage unit 113 before inputting to the input section of the drive unit 112. Moreover, the correction signal that has been stored is input from the storage unit 113 to the input section of the drive unit 112 as the correction information.

Even in the scanning laser microscope according to the fourth example, an effect similar to the effect of the scanning laser microscope according to the second example is shown. Moreover, an effect of the scanning laser microscope according to the third example and the scanning laser microscope according to the fourth example are also shown in addition.

Figure 6:
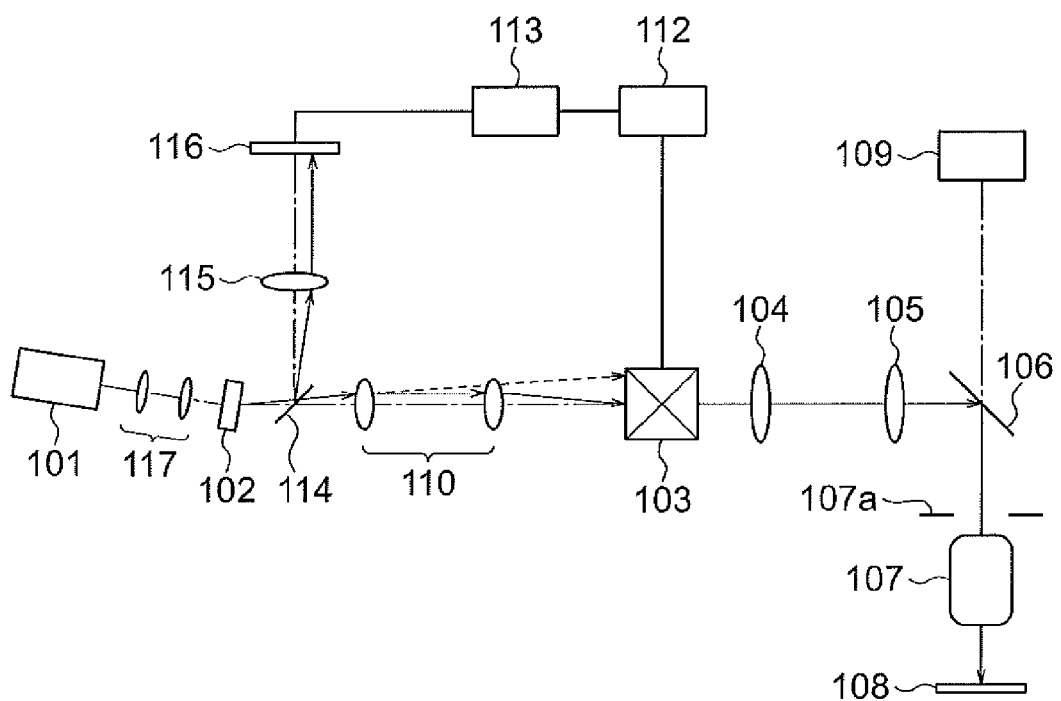
FIG. 6 is a diagram showing a scanning laser microscope according to a fifth example.
Figure 7:
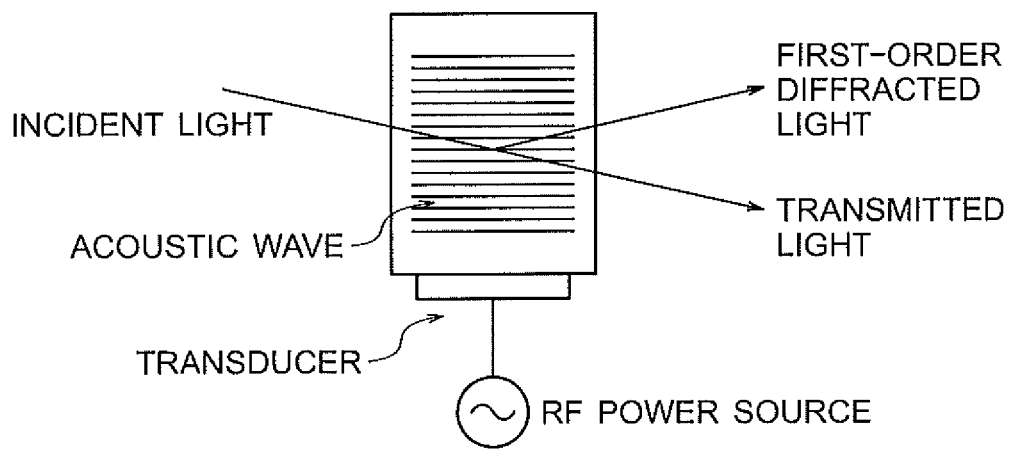
FIG. 7 is diagram showing a principle of operation of an acoustic optical element.

FIG. 6 is a diagram showing a scanning laser microscope according to the fifth example. The scanning laser microscope according to the fifth example includes, in addition to the arrangement of the scanning laser microscope according to the fourth example, an optical unit 117.

Depending on the laser light source 101, sometimes the angle of emergence of the laser light emerged from the laser light source 101 changes slightly with time. As the angle of emergence of the laser light changes, the center of the laser light and the position of the pupil 107a of the objective 107 cease to coincide similarly as in a case in which, the angle of emergence of the laser light has changed by the acoustic optical element 102.

Therefore, in the scanning laser microscope according to the fifth example, the optical unit 117 is disposed in a space between the laser light source 101 and the acoustic optical element 102. The optical unit 117 may be a relay optical system for instance, and a position of the laser light source 101 and the position of the acoustic optical element 102 are conjugate through the optical unit 117.

By making such an arrangement, since the position of the laser light source 101 and the pupil 107a of the objective 107 become conjugate, even if the angle of emergence of the laser light emitted from the laser light source 101 changes, it is possible to make the center of the laser light and the position of the pupil 107a of the objective 107 coincide.

Furthermore, since the scanning laser microscope includes the optical position detector, it is possible to detect the change in the angle of emergence of the laser light emitted from the laser light source 101 and the change in the angle of emergence of the laser light emerged from the acoustic optical element 102 by the optical position detector 116. Accordingly, it is possible to achieve highly accurate correction information.

The present invention can take various modified examples without departing from the scope of the invention.

As heretofore mentioned, the present invention is suitable for a scanning optical microscope in which, even if the light intensity is changed by a light modulation element, a center of illumination light with respect to a center of a pupil of an optical system does not change between before and after the change of light intensity. Moreover, the present invention is suitable for a scanning optical microscope in which, even if the light intensity is changed by the light modulation element, a position at which the illumination light is irradiated does not change between before and after the change of light intensity.

What is claimed is:
1. A scanning optical microscope comprising:
a light source which emits illumination light;
a light converging optical system which irradiates the illumination light to a specimen;
a stage on which the specimen is placed;

19 a scanning unit which displaces the illumination light and the stage relatively;
a detecting optical system which collects light from the specimen;
a photodetector which detects the light from the specimen;
a light modulation element; and
a relay optical system,
wherein:
the light modulation element and the relay optical system are disposed on a light-converging-optical-system-side of the light source,
the light modulation element is an acoustic optical element,
the light modulation element is configured to adjust light intensity of the illumination light in accordance with an amplitude change of a modulated signal input to the light modulation element, a frequency of the modulated signal being maintained constant,
the light modulation element is positioned such that the illumination light which passes through the light modulation element in a state in which the modulated signal of a predetermined amplitude is input thereto coincides with an optical axis of the light converging optical system, and
a position of a pupil of the light converging optical system and a position of the light modulation element are conjugate through at least the relay optical system.

2. The scanning optical microscope according to claim 1, further comprising:
a pupil projection optical system;
a light deflecting member; and
a drive unit which inputs a deflection signal to the light deflecting member, wherein:
the position of the light modulation element and a position of the light deflecting member are conjugate through the relay optical system,
the position of the pupil of the light converging optical system and the position of the light deflecting member are conjugate through the pupil projection optical system,
an emergence angle θ of the illumination light emerging from the light modulation element is an angle between (i) the optical axis of the light converging optical system and (ii) the illumination light emerging from the light modulation element, and when the modulated signal of the predetermined amplitude is input to the light modulation element, the emergence angle θ is θ=0°,
the drive unit has an input section,
correction information for deflecting the illumination light incident on the light deflecting member by a predetermined angle is input to the input section,
the predetermined angle is an angle which counterbalances the emergence angle θ of the illumination light emerging from the light modulation element, and
the drive unit inputs the deflection signal to the light deflecting member, the deflection signal being generated based on the correction information.

3. The scanning optical microscope according to claim 2, wherein:
the scanning unit includes a light deflecting element, and is disposed on a light-converging-optical-system-side of the relay optical system, and
the scanning unit is disposed at a position conjugate with the pupil of the light converging optical system, and the light deflecting element of the scanning unit also functions as the light deflecting member.

4. The scanning optical microscope according to claim 2, further comprising:

20 a storage unit, wherein the correction information is stored in advance in the storage unit.

5. The scanning optical microscope according to claim 2, further comprising:
a beam splitter; and
an optical position detector,
wherein:
the beam splitter is arranged between the light modulation element and the light deflecting member,
the optical position detector is disposed at a position where light from the beam splitter is received,
a correction signal is generated based on a detection signal that is output from the optical position detector, and
the correction information is the correction signal.

6. The scanning optical microscope according to claim 5, further comprising:
a storage unit, wherein the correction signal is stored in the storage unit.

7. The scanning optical microscope according to claim 1, wherein:
the scanning unit includes a light deflecting element, and is disposed on a light-converging-optical-system-side of the relay optical system, and
the scanning unit is disposed at a position conjugate with the pupil of the light converging optical system.

8. The scanning optical microscope according to claim 1, wherein a beam expander is disposed on a light-converging-optical-system-side of the relay optical system.

9. The scanning optical microscope according claim 1, wherein:
an optical unit is disposed between the light source and the light modulation element, and
a position of the light source and a position of the light modulation element are conjugate through the optical unit.

10. The scanning optical microscope according to claim 1, wherein the light source is an ultrashort pulse laser which emits near-infrared light.

11. The scanning optical microscope according to claim 1, wherein the light converging optical system functions also as the detecting optical system.

12. The scanning optical microscope according to claim 1, further comprising:
a pupil projection optical system;
a light deflecting element;
wherein:
the scanning unit includes the light deflecting element, and is disposed on a light-converging-optical-system-side of the relay optical system,
the scanning unit is disposed at a position conjugate with the pupil of the light converging optical system,
the position of the scanning unit and the position of the pupil of the light converging optical system are conjugate through the pupil projection optical system, and
the position of the light modulation element and the position of the scanning unit are conjugate through the relay optical system.

13. The scanning optical microscope according to claim 1, further comprising a beam expander.

14. A scanning optical microscope comprising:
a light source which emits illumination light;
a light converging optical system which irradiates the illumination light to a specimen;
a stage on which the specimen is placed;
a scanning unit which displaces the illumination light and the stage relatively;

a detecting optical system which collects light from the specimen;
a photodetector which detects the light from the specimen;
a pupil projection optical system;
a light deflecting member;
a drive unit which inputs a deflection signal to the light deflecting member;
a light modulation element; and
a relay optical system,
wherein:
the light modulation element and the relay optical system are disposed on a light converging optical system side of the light source,
the light modulation element is configured to adjust light intensity of the illumination light in accordance with an amplitude change of a modulated signal input to the light modulation element, a frequency of the modulated signal being maintained constant,
the light modulation element is positioned such that the illumination light which emerges from the light modulation element in a state in which the modulated signal of a predetermined amplitude is input thereto coincides with an optical axis of the light converging optical system,
a position of a pupil of the light converging optical system and a position of the light modulation element are conjugate through at least the relay optical system,
the position of the light modulation element and a position of the light deflecting member are conjugate through the relay optical system,
the position of the pupil of the light converging optical system and the position of the light deflecting member are conjugate through the pupil projection optical system,
an emergence angle θ of the illumination light emerging from the light modulation element is an angle between (i) the optical axis of the light converging optical system and (ii) the illumination light emerging from the light modulation element, and when the modulated signal of the predetermined amplitude is input to the light modulation element, the emergence angle θ is θ=0°,
the drive unit has an input section,
correction information for deflecting the illumination light incident on the light deflecting member by a predetermined angle is input to the input section,
the predetermined angle is an angle which counterbalances the emergence angle θ of the illumination light emerging from the light modulation element, and
the drive unit inputs the deflection signal to the light deflecting member, the deflection signal being generated based on the correction information.

15. The scanning optical microscope according to claim 14, wherein:
the scanning unit includes a light deflecting element, and is disposed on a light-converging-optical-system-side of the relay optical system, and
the scanning unit is disposed at a position conjugate with the pupil of the light converging optical system, and the light deflecting element of the scanning unit also functions as the light deflecting member.

16. The scanning optical microscope according to claim 14, further comprising:
a storage unit, wherein the correction information is stored in advance in the storage unit.

17. The scanning optical microscope according to claim 14, further comprising:
a beam splitter; and
an optical position detector,
wherein:
the beam splitter is arranged between the light modulation element and the light deflecting member,
the optical position detector is disposed at a position where light from the beam splitter is received,
a correction signal is generated based on a detection signal that is output from the optical position detector, and
the correction information is the correction signal.

18. The scanning optical microscope according to claim 17, further comprising:
a storage unit, wherein the correction signal is stored in the storage unit.

* * * * *